United States Patent
Fink

(10) Patent No.: US 8,970,144 B2
(45) Date of Patent: Mar. 3, 2015

(54) METHOD FOR OPERATING AN ELECTRIC TRACTION DRIVE SYSTEM COMPRISING A BATTERY DIRECT INVERTER AND ASSOCIATED CONTROL APPARATUS

(71) Applicants: Robert Bosch GmbH, Stuttgart (DE); Samsung SDI Co., Ltd., Yongin-si, Gyeonggi-do (KR)

(72) Inventor: Holger Fink, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 69 days.

(21) Appl. No.: 13/927,988

(22) Filed: Jun. 26, 2013

(65) Prior Publication Data

US 2014/0001986 A1    Jan. 2, 2014

(30) Foreign Application Priority Data

Jun. 27, 2012   (DE) .......................... 10 2012 210 910

(51) Int. Cl.
| | |
|---|---|
| *H02P 29/00* | (2006.01) |
| *H02P 21/14* | (2006.01) |
| *B60L 11/18* | (2006.01) |
| *B60L 15/00* | (2006.01) |
| *H02J 7/02* | (2006.01) |

(52) U.S. Cl.
CPC .......... *H02P 29/0033* (2013.01); *H02P 21/148* (2013.01); *B60L 11/1855* (2013.01); *B60L 11/1853* (2013.01); *B60L 11/1864* (2013.01); *B60L 15/007* (2013.01); *H02J 7/022* (2013.01); *Y02T 10/643* (2013.01)
USPC .............................. 318/139; 318/34; 318/558

(58) Field of Classification Search
CPC ................................................... H02P 29/0033
USPC ............................................. 318/139, 34, 558
See application file for complete search history.

(56) References Cited

U.S. PATENT DOCUMENTS 6,359,405 B1 * 3/2002 Tsurumi ....................... 318/434

FOREIGN PATENT DOCUMENTS

DE     10 2010 027 864 A1    12/2011

* cited by examiner

*Primary Examiner* — David S Luo
(74) *Attorney, Agent, or Firm* — Maginot, Moore & Beck LLP

(57) ABSTRACT

The disclosure relates to a method for operating an electric traction drive system, which comprises an electric motor and a battery with a plurality of battery strings having battery modules. Each battery module is configured to be connected selectively with respect to output terminals of a respective battery string with positive polarization or negative polarization or to be bridged in the respective battery string, such that each battery string is configured to produce an adjustable output voltage. The battery modules are each monitored for proper functioning. When a technical fault in at least one battery module is detected, the at least one battery module is bridged and the traction drive system is transferred to a transition state in which the electric motor continues to be supplied and actuated by the connected battery modules in the battery module string such that a presently generated torque is maintained unchanged.

10 Claims, 4 Drawing Sheets

METHOD FOR OPERATING AN ELECTRIC TRACTION DRIVE SYSTEM COMPRISING A BATTERY DIRECT INVERTER AND ASSOCIATED CONTROL APPARATUS

This application claims priority under 35 U.S.C. §119 to patent application no. DE 10 2012 210 910.2, filed on Jun. 27, 2012 in Germany, the disclosure of which is incorporated herein by reference in its entirety.

The present disclosure relates to a method for operating an electric traction drive system, which comprises an electric motor and a battery with a plurality of battery strings, in each of which a plurality of battery modules are arranged, which can each be connected selectively with respect to the output terminals of the respective battery string with positive polarization or negative polarization or can be bridged in the respective battery string, with the result that each battery string produces an adjustable output voltage. In addition, the disclosure relates to a corresponding apparatus for actuating an electric traction drive system. In addition, the disclosure relates to a vehicle comprising an electric traction drive system, which has an electric motor connected to a battery direct inverter and the apparatus according to the disclosure for actuating the electric drive system.

BACKGROUND

The prior art discloses batteries which are used in hybrid and electric vehicles and which are referred to as traction batteries since they are used for feeding electric drives.

The basic circuit diagram of an electric traction drive system 10 known from the prior art as is used, for example, in electric and hybrid vehicles or else in stationary applications such as in the rotor blade adjustment of wind turbines, is illustrated in FIG. 1. A battery (traction battery) 11 is connected to a DC voltage intermediate circuit, which is buffered by a capacitor 60. In addition, a pulse-operated inverter or pulse-operated converter 50 is connected to the DC voltage intermediate circuit and provides sinusoidal voltages which are phase-shifted with respect to one another at three outputs via in each case two switchable semiconductor valves 51 and two diodes 52 for operating an electric motor 70. In order to simplify the illustration, only one semiconductor valve and one diode are provided with reference symbols in the drawing. The capacitance of the capacitor 60 is selected to be high enough to stabilize the voltage in the DC voltage intermediate circuit for a period in which one of the switchable semiconductor valves 51 is on. In a practical application such as an electric vehicle, this requires a high capacitance in the mF range.

Three-phase motors are generally used as electric motors (electric machines) 70 in such traction drives 10. These are usually asynchronous motors, permanently regulated synchronous motors or separately excited synchronous motors. In order to feed the electric machine 70, pulse-operated converters 50 are generally used which are generally implemented in the traction region in electric and hybrid vehicles with semiconductor switches 51 which are in the form of insulated-gate bipolar transistors (IGBTs).

The battery 11 illustrated in FIG. 1 comprises a battery module string 12, in which a large number of battery cells 21 are connected in series and optionally additionally in parallel in order to achieve a high output voltage and battery capacity desired for a respective application, wherein, in order to simplify the illustration in the drawing, only one battery cell has been provided with a reference symbol. A charging and isolating device 30 is connected between the positive pole of the battery cells 21 and a positive battery terminal 22. Optionally, an isolating device 40 can additionally be connected between the negative pole of the battery cells and a negative battery terminal 23.

The isolating and charging device 30 and the isolating device 40 each comprise a contactor 31 and 41, respectively, which are provided for disconnecting the battery cells 21 from the battery terminals 22, 23 in order to switch the battery terminals 22, 23 to be free of voltage. Owing to the high DC voltage of the series-connected battery cells 21, there is otherwise a considerable potential risk for maintenance personal and others. In addition, a charging contactor 32 with a charging resistor 33 connected in series with the charging contactor 32 is provided in the charging and isolating device 30. The charging resistor 33 limits a charging current for the capacitor 60 when the battery 11 is connected to the DC voltage intermediate circuit. For this purpose, first the contactor 31 is left open and only the charging contactor 32 is closed. When the voltage at the positive battery terminal 22 reaches the voltage of the battery cells 21, the contactor 31 can be closed and possibly the charging contactor 32 opened. The contactors 31, 41 and the charging contactor 32 represent an increase in the costs for a battery 11 which is not inconsiderable since stringent requirements are placed on the reliability of said contactors and on the currents to be conducted thereby.

If a technical problem occurs in the traction battery of such a traction drive which can either result directly in failure of a battery cell or, on further operation of the battery, in a safety-relevant unsafe state of the battery, the battery is transferred to a safe state by the battery management system. In accordance with the prior art, this state is produced in lithium-ion battery systems by virtue of the battery being disconnected from the DC voltage intermediate circuit by the contactors of the charging and isolating device being opened.

The management system of the traction drive then needs to cope with a situation whereby the battery is no longer available as energy store. Depending on the operating state of the electric motor, the management system now only essentially achieves a situation in which there is no destruction of the pulse-operated inverter or inverter. Destruction of the inverter can be brought about, for example, by an impermissibly severe rise in the voltage of the DC voltage intermediate circuit. As a result, the management system can no longer take into consideration a response of the traction drive which is expedient in terms of driving dynamics or theoretically it is no longer even possible at all to set a response of the traction drive which is expedient in terms of driving dynamics owing to the disconnection of the battery.

As a consequence, the traction drive outputs torques which are undesirable from a driving dynamics point of view or are even impermissible, in particular suddenly occurring, large negative torques. This then needs to be managed in the overall concept of such a traction drive of a vehicle by additional measures, such as mechanical freewheeling, for example. These additional measures are complex and extremely undesirable since they are only required in the case of a technical fault in the battery and are therefore generally never used.

In the earlier patent application by the applicant with the reference DE 10 2010 027 864 A1, a polyphase battery system with a battery with output voltages which are adjustable stepwise is described. The block circuit diagram of a drive system (traction drive) 10 with such a battery 110 is illustrated in FIG. 2. The battery 110 comprises a plurality of battery strings 120, in each of which a plurality of battery modules 130, 140 with battery cells connected in series and/or or in parallel are arranged. The battery modules 130, 140 can each be connected in series via so-called coupling units (not illustrated separately) which are associated therewith in each case in an associated battery string 120 with a positive or negative orientation or are bridged. A charging and isolating device 30 is connected in each battery string 120 between the positive pole of an uppermost battery module 130 and a positive battery string terminal 122. Optionally, in addition an isolating device 40 can be connected between the negative pole of a lowermost battery module 140 and a negative battery string terminal 123 in each battery string 120. In particular with a three-phase embodiment, systems with such batteries 110 are also referred to as battery direct inverters (DINV) 110. If a traction drive 10 is implemented using such a battery direct inverter, the traction battery 10 illustrated in FIG. 1 and the pulse-operated inverter 50 are replaced by the battery direct inverter 110.

The possible profile of the output voltage UBS of each phase of the battery direct inverter 110 illustrated in FIG. 2 is illustrated in FIG. 3. The illustrated output voltage UBS is in this case the voltage generated by a battery string 120. FIG. 3 shows the dependence of the output voltage UBS of a battery string 120 on the number k of battery modules 130, 140 connected to form the battery string 120 with a positive or negative orientation. The battery modules 130, 140 connected to form each battery string 120 in this case each have the same module voltage UM. The output voltage UBS of the battery string 120 which is illustrated with a dependence on the connected number k of battery modules 130, 140 is linear and follows the relationship UBS=k·UM for battery modules 130, 140, which have been connected with a positive orientation or a positive polarization to give the associated battery string 120, or the relationship UBS=−k·UM for battery modules 130, 140, which have been connected with a negative orientation or negative polarization to give the associated battery string 120. The relationship 1≤k≤n applies in this case, and n is the maximum number of battery modules 130, 140 which can be connected to form the battery string 120. The maximum output voltage UBS of the battery string 120 can then correspondingly assume the value n·UM. The minimum output voltage UBS of the battery string 120 can then correspondingly assume the value −n·UM.

SUMMARY

According to the disclosure, a method for operating an electric traction drive system which comprises an electric motor and a battery with a plurality of battery strings is disclosed. In this case, each battery string has a plurality of battery modules, which can in each case be connected selectively with respect to the output terminals of a respective battery string with positive polarization or negative polarization or can be bridged in the respective battery string, with the result that each battery string produces an adjustable output voltage. During operation of the traction drive system, the battery modules are each monitored for proper functioning. If, during the monitoring, a technical fault in at least one battery module is detected, the at least one battery module is bridged immediately. Then the traction drive system is transferred to a transition state in which the electric motor continues to be supplied and actuated by the connected battery modules of the battery module string in such a way that a torque generated at that time can be maintained unchanged.

According to the disclosure, in addition, an apparatus for controlling an electric traction drive system which has an electric motor and a battery is provided. The battery comprises a plurality of battery strings, of which each battery string has a plurality of battery modules, which can each be connected selectively with respect to the output terminals of the respective battery string with positive polarization or negative polarization or can be bridged in the respective battery string, with the result that each battery string produces an adjustable output voltage. The apparatus including a monitoring device configured to monitor the battery modules during operation in each case for proper functioning and, if, during monitoring, a technical fault in at least one battery module is detected, to actuate the traction drive system in such a way that the at least one battery module is bridged and the traction drive system is transferred to a transition state. In this case, the traction drive system is operated in the transition state in such a way that the electric motor continues to be supplied and actuated by the connected battery modules in the battery module string in a way in which a torque generated at that time can be maintained unchanged.

The disclosure relates in particular to batteries which are operated using a battery direct inverter (DINV) and can provide a three-phase AC voltage system directly at the input of said batteries.

In particular, in the case of electric and hybrid vehicles, the traction batteries can be in the form of battery direct inverters. The output voltages of the battery direct inverter can in each case be adjusted stepwise between a minimum output voltage and a maximum possible output voltage. The minimum output voltage of a phase or of a battery string is then reached when all of the battery modules in this phase are connected with negative orientation, i.e. with a negative polarization, via the coupling units associated therewith. The maximum output voltage is correspondingly achieved when all of the battery modules in this phase are connected with a positive orientation or positive polarization.

If a technical fault occurs in one of the battery modules of the battery direct inverter such as a sudden unforeseeable failure or malfunction of at least one of the battery cells arranged therein, for example, wherein the malfunction can result in a safety-relevant state of the affected battery module at least during further operation, this battery module is bridged first of all by means of the coupling unit associated therewith. This battery module is therefore no longer available to the battery of the battery direct inverter for the emission or consumption of electrical energy. The remaining battery modules can continue to feed the traction drive after identification of a technical defect in one of the battery modules.

In the event of the occurrence of a technical fault in the battery of the battery direct inverter, the traction drive operated thereby, thanks to the disclosure, is defined and reliably transferred to a special transition state until a battery diagnosis and evaluation of the fault have taken place. In the transition state, the drive with the present torque which the drive has emitted prior to the occurrence of the technical problem on the shaft, can continue to be operated. In the transition state, the torque remains constant and the drive can continue to respond to the torque input parameters which are communicated by the driver via the accelerator pedal. This is a considerable improvement in respect of the situation known from the prior art from the point of view of driving dynamics. After the evaluation of the fault, the drive train can then be transferred to a type of "fault state", in which the faulty battery module is no longer involved in the feed to the drive, wherein the drive can continue to be operated with reduced performance, such as with a shorter electrical range, for example.

The additional measures required in the prior art with respect to the drive function, such as the implementation of mechanical freewheeling, for example, which is generally required and used in any case only in the event of the occurrence of a fault in the battery, can thus be dispensed with. The method according to the disclosure and the corresponding apparatus manage without any additional hardware measures and can therefore be implemented without corresponding additional costs for the manufacture of the drive systems according to the disclosure. The transition operating mode is maintained until, by virtue of a fault diagnosis, a decision can be made as to whether and possibly how the traction battery can continue to be operated without any safety risk and in particular with lower performance.

In a particular embodiment of the disclosure, an electric motor in the form of a three-phase machine is adjusted by means of field-oriented control for the continued operation of the drive system with a still constant torque.

In particular once the drive system has been transferred to the transition state, a battery diagnosis is implemented in accordance with the disclosure, and this is used to decide whether the drive system continues to be operated by means of the battery with the failed and bridged battery module and/or whether further safety-relevant measures are introduced.

According to the disclosure, the drive is favorably always operated in such a way that the management of the drive is also ensured when any desired battery module of the battery direct inverter fails suddenly. This measure can have effects on the permissible maximum voltage which the three-phase drives require at their terminals for maintaining the management of said drives. In addition, this is used to determine the rotation speeds at which an asynchronous machine is moved to the so-called field-weakening operating mode and no longer emits its maximum possible torque to the shaft. If a fault event occurs in a battery module, the drive can adjust the voltage ratios required for controlled management of the electric motor at the terminals of the machine even when this faulty battery module is bridged.

The three-phase machine then continues to be operated via a so-called field-oriented management or field-oriented control known to a person skilled in the art in such a way that the desired torque predetermined by the driver via the accelerator pedal is converted. The driver therefore initially does not notice that one of the battery modules has failed owing to a technical problem and has been bridged. In the transition phase, a battery diagnosis and an evaluation of the state of the battery are used to decide whether a technical problem is present which only affects one battery module or whether a problem is present which affects the entire battery.

According to the disclosure, when the drive system continues to be operated by means of the battery with the failed and bridged battery module once the battery diagnosis according to the disclosure has been implemented, the battery can continue to operate the drive system with a correspondingly reduced output voltage. In other words, if it is decided from the battery diagnosis that the traction drive system can continue to be operated, the traction drive system is then transferred to such an operating state in which the electric motor continues to be supplied with an output voltage which is reduced by the value of a battery module voltage corresponding to the bridged defective battery module.

On the other hand, a sufficiently large number of further battery modules can be connected as a replacement for the at least one bridged defective battery module. In such a procedure, the electric motor can continue to be supplied with an unchanged or only slightly reduced output voltage.

This also means that, depending on the result of the battery diagnosis performed, it is possible to decide whether the traction drive continues to be operated with the exclusion only of the one faulty battery module or whether further measures for ensuring the safety need to be introduced, such as, for example, shutdown of further battery modules, a driver warning or a reduction in the performance of the drive.

Starting with the present state of the battery, it is also possible for the sudden failure of two or more battery modules to be managed safely. This merely requires that a correspondingly high voltage reserve needs to be maintained during operation of the drive in comparison with the maximum available voltage.

In a particular advantageous embodiment of the disclosure, when the drive system continues to be fed by means of the battery with the failed and bridged battery module and then a further battery module fails, the drive system continues to be operated by means of a correspondingly repeated method. This means that the method according to the disclosure described previously also continues to be applicable when the battery already has a faulty module but the rest of the battery continues to be operated. For this purpose, the battery management system or the management system of the drive only needs to take into consideration the fact that the maximum available voltage, the storage capacity and the performance of the battery are matched to the conditions which result from the failure of a battery module.

By means of the method according to the disclosure and the apparatus, a situation in which at least one battery module fails can be managed safely enough for the drive to be transferred to a transition state in a reliable manner, in which it is still possible to respond to present torque parameters input by the driver.

According to a further aspect of the disclosure, an electric battery system is provided which comprises a plurality of battery strings, wherein in each case a plurality of battery modules are arranged in each battery string. In this case, the battery modules are designed in such a way that they are each connected selectively with respect to the output terminals of a respective battery string with positive polarization or negative polarization or can be bridged in the battery string.

According to the disclosure, the battery can be in particular a lithium-ion battery.

In addition, the disclosure provides a vehicle which has an electric traction drive system, in which an electric motor and a battery provided for supplying power to the electric motor are arranged. The battery has a plurality of batteries, for generating an adjustable output voltage, a battery module string with a plurality of battery modules, each comprising at least one battery cell. The battery modules are designed such that they can each be connected in series to form the battery module string or are designed such that they can be bridged in the battery module string. In addition, the battery system is equipped with the control apparatus according to the disclosure.

According to the disclosure, the battery is in particular a lithium-ion battery.

In addition, the disclosure provides a vehicle which has an electric motor and the battery system and/or the apparatus according to the disclosure, wherein the battery system or the apparatus are arranged in a drive train of the vehicle.

Advantageous developments of the disclosure are specified in the dependent claims and described in the description.

BRIEF DESCRIPTION OF THE DRAWINGS

Exemplary embodiments of the disclosure will be explained in more detail with reference to the drawings and the description below. In the drawings.

DETAILED DESCRIPTION

Figure 4:
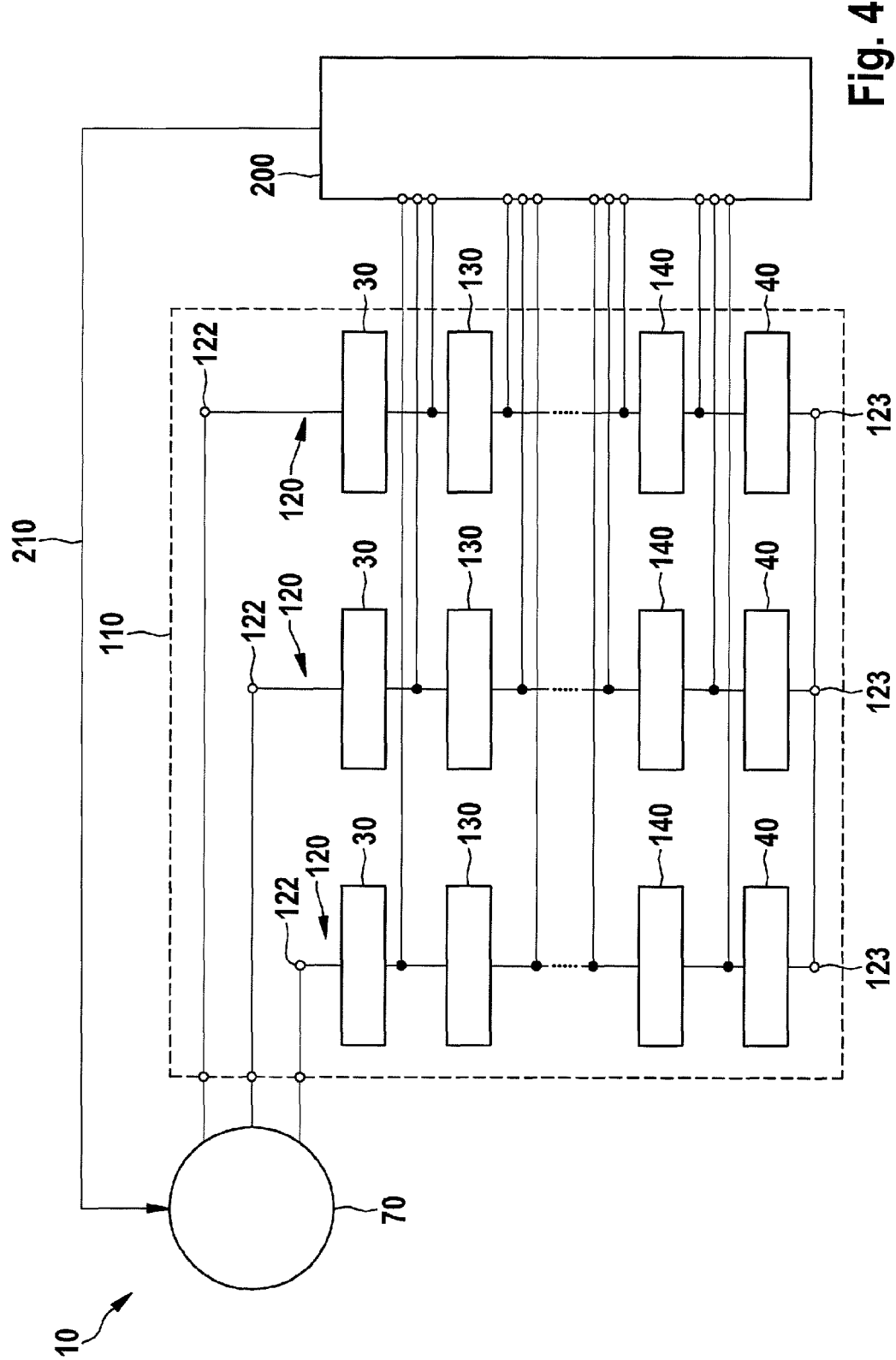
FIG. 4 shows the basic circuit diagram of a traction drive in accordance with a first embodiment of the disclosure with an electric motor, which is connected to a battery with three battery strings, each formed from a plurality of battery modules each having at least one battery cell, wherein the battery modules are designed such that they can be connected in series to form the associated battery string and can be bridged in order to generate an adjustable output voltage for each battery string.

FIG. 4 illustrates the basic circuit diagram of a traction drive 10 in accordance with a first embodiment of the disclosure.

The traction drive comprises a battery (traction battery) 110 with three battery strings 120, which provide sinusoidal voltages which are phase-shifted with respect to one another at the three outputs of said three battery strings for the operation of the electric motor 70.

The electric motor 70 is in the form of a three-phase motor.

The battery strings 120 of the battery 110 are each formed from a plurality of battery modules 130, 140, which can each be connected in series with one another to form the associated battery string 120 and each comprise battery cells connected in series and/or in parallel.

Figure 1:
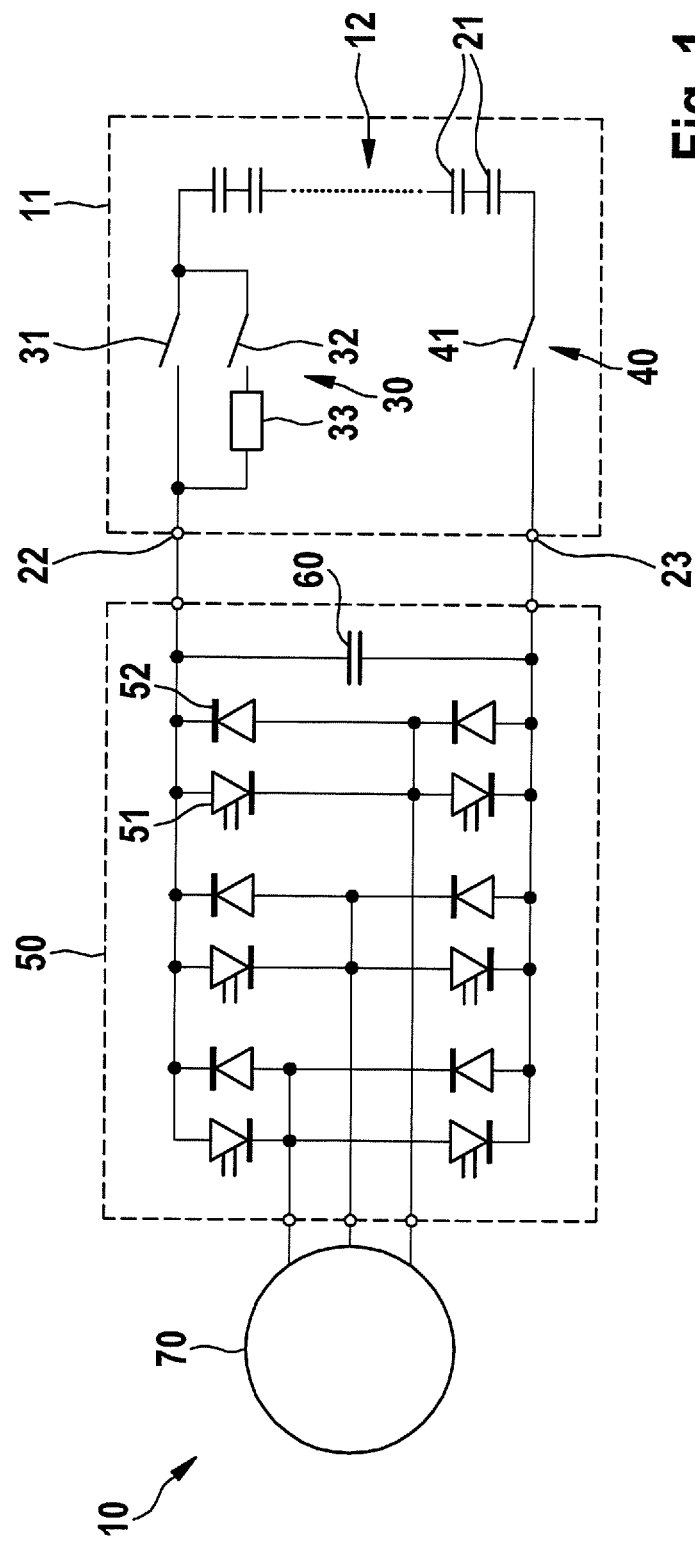
FIG. 1 shows the basic circuit diagram of a traction drive known from the prior art with an electric motor which is connected to a battery with a battery string formed from a plurality of battery cells.
Figure 2:
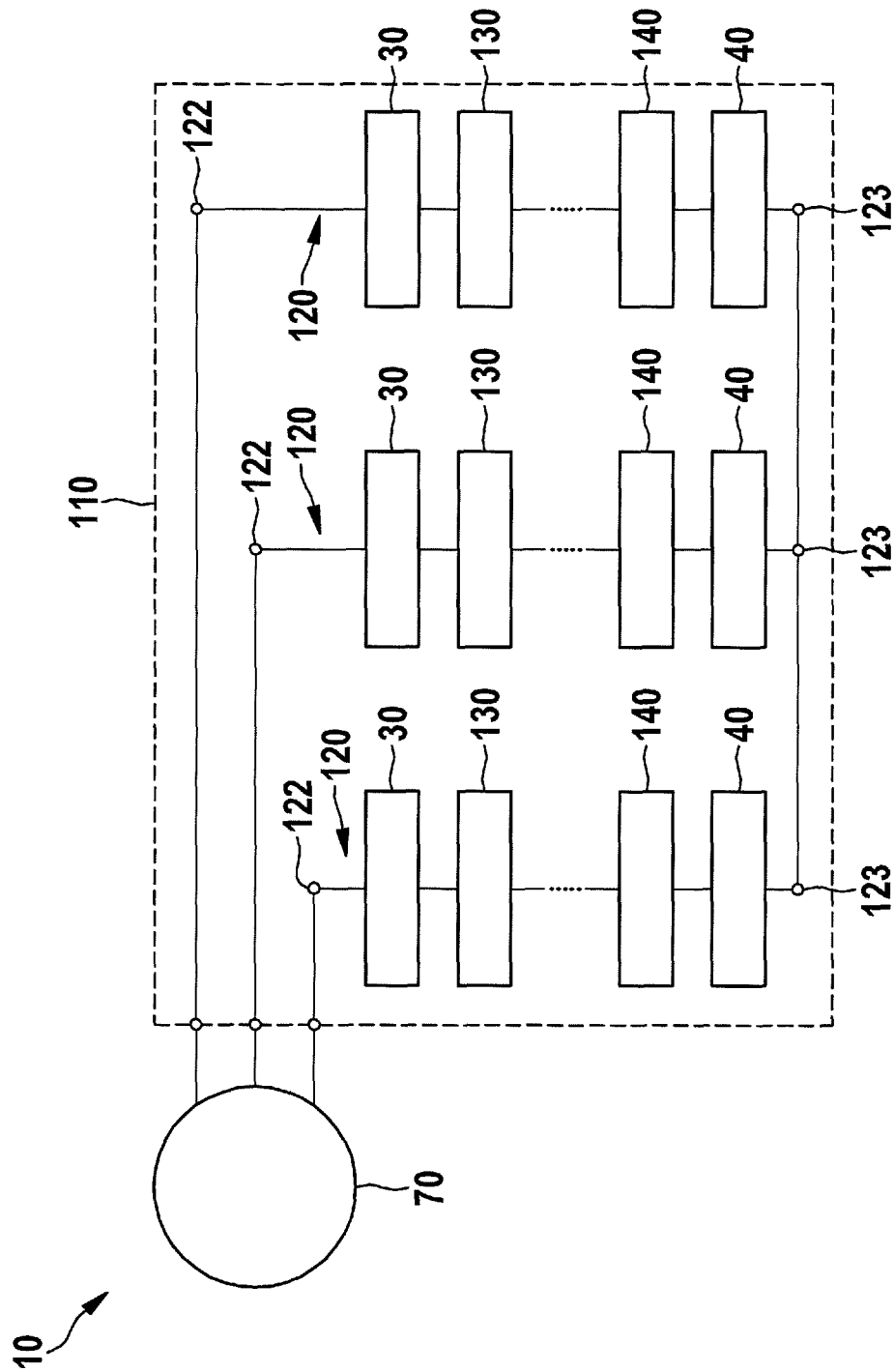
FIG. 2 shows the basic circuit diagram of a traction drive known from the prior art with an electric motor, which is connected to a battery with three battery strings, each formed from a plurality of battery modules each having at least one battery cell, wherein the battery modules are designed such that they can be connected in series to form the associated battery string and can be bridged in order to generate an adjustable output voltage for each battery string.
Figure 3:
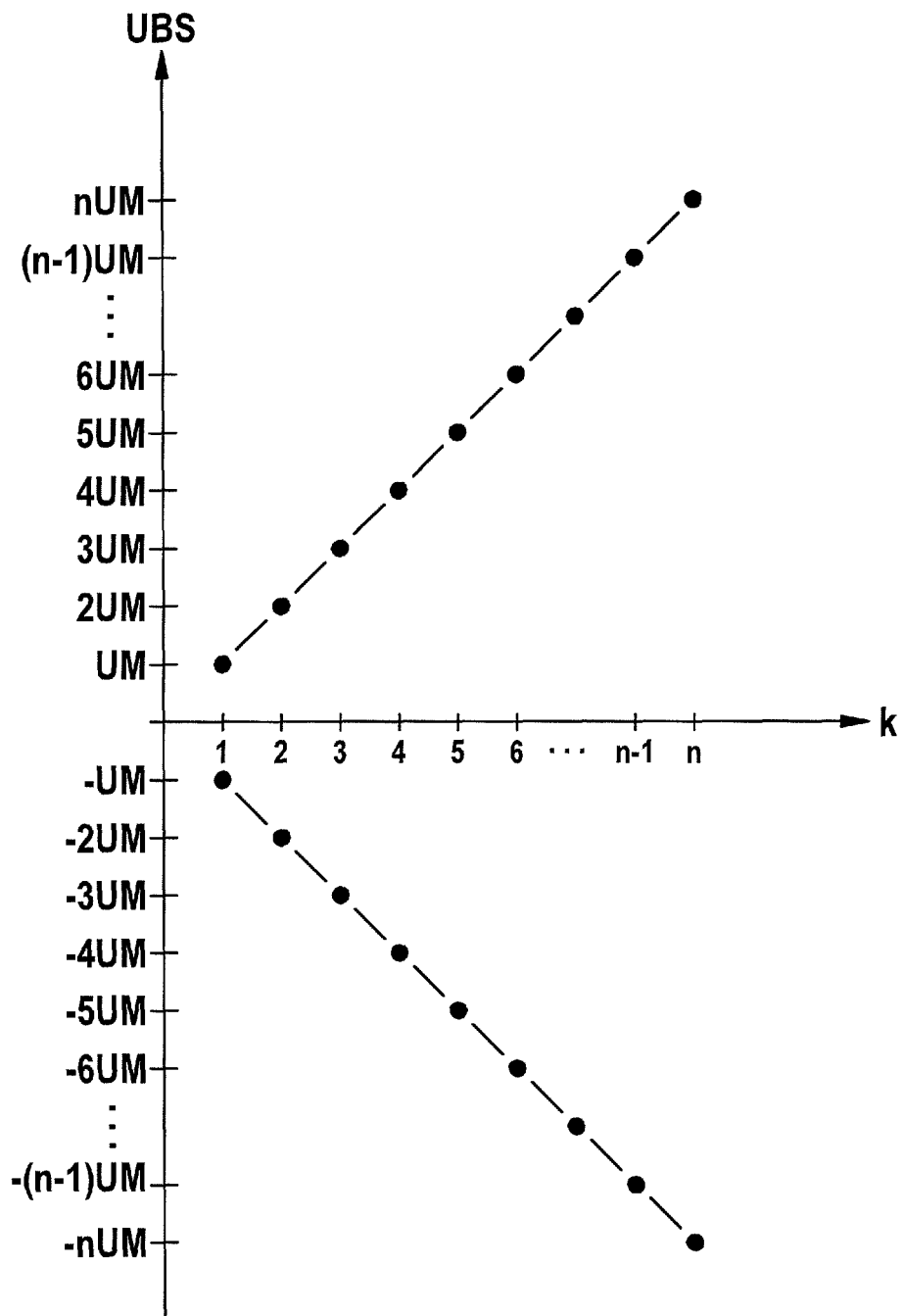
FIG. 3 shows a possible profile of the output voltage of each battery string of the battery illustrated in FIG. 2 depending on the number of battery modules connected to form the corresponding battery string.

In order to simplify the illustration, only two battery modules 130, 140 per battery string 120 are illustrated in FIG. 4. These battery modules 130, 140 can be connected to one another via the coupling units respectively associated therewith (not illustrated separately) in the associated battery string 120 with a positive or negative orientation or can be bridged. A charging and isolating device 30, which is formed in the same way as the charging and isolating device shown in FIG. 1, is connected between the positive pole of an uppermost battery module 130 and a positive battery string terminal 122 in each battery string 120. Optionally, an isolating device 40, which is designed in the same way as the isolating device shown in FIG. 1, can additionally be connected between the negative pole of a lowermost battery module 140 and a negative battery string terminal 123 in each battery string 120. Systems with such batteries 110 are also referred to as battery direct inverters (DICO) 110.

The traction drive 110 according to the disclosure also comprises a control apparatus 200, which is electrically connected to the respective connections of the battery modules 130, 140. The control apparatus 200 is also designed to measure the voltages of the individual battery modules 130, 140. In addition, the control apparatus 200 is designed such that, when during operation of the traction drive system 10 a battery module 130, 140 connected to form the battery module string 120 fails or a defect in the battery module is detected, it continues to supply power to the electric motor 70 by means of the battery 110 but without the failed and bridged battery modules 130, 140 and in the process adjusts the electric motor 70 via the control line 210 in such a way that the drive system 10 is transferred to a transition state, in which the drive system 10 produces an initially unchanged torque as prior to the failure of the at least one battery module 130, 140.

In accordance with the embodiment shown in FIG. 4, this is achieved in particular by virtue of the fact that the electric motor 70 which is in the form of a three-phase machine, in this case an asynchronous machine, is adjusted or actuated by means of field-oriented control.

In addition, the control apparatus 200 of the particular embodiment shown here is designed to implement a battery diagnosis during the time in which the drive system 10 is in the transition state and on this basis decide whether the traction drive 10 is still being operated with at least one failed and bridged battery module 130, 140 and/or whether other safety-relevant measures are introduced. Preferably, the control apparatus 200 has a battery diagnosis unit for this purpose.

Therefore, the disclosure provides a method and a control apparatus with which an electric drive system which has a battery direct inverter can advantageously be transferred to a transition state, in which there is no reduction of the present torque.

What is claimed is:

1. A method for operating an electric traction drive system, including an electric motor and a battery, the battery including a plurality of battery strings, each battery string of the plurality of battery strings including output terminals and a plurality of battery modules, the method comprising:
    producing an adjustable output voltage with each battery string of the plurality of battery strings by selectively connecting battery modules of the plurality of battery modules with positive polarization or negative polarization with respect to the output terminals of a respective battery string, or bridging battery modules of the plurality of battery modules in the respective battery string;
    monitoring each battery module of the plurality of battery modules for proper functioning during operation of the electric traction drive system;
    bridging a detected battery module of the plurality of battery modules in response to detecting a technical fault of the detected battery module; and
    transferring the electric traction drive system to a transition state in response to detecting the technical fault of the detected battery module,
    wherein in the transition state the electric motor continues to be supplied with power and is actuated by remaining connected battery modules of the plurality of battery modules such that a torque produced during the transition state remains unchanged.

2. The method according to claim 1, further comprising:
    operating the electric motor in the transition state via field-oriented control,
    wherein the electric motor is a three-phase machine.

3. The method according to claim 1, further comprising:
    implementing a battery diagnosis routine while the traction drive system is operated in the transition state to determine if the electric traction drive system can continue to be operated by the battery with the detected battery module being bridged and/or whether safety-relevant measures are introduced.

4. The method according to claim 3, wherein when the battery diagnosis routine determines that the electric traction drive system can continue to be operated by the battery with the detected battery module being bridged, the electric traction drive system is transferred to an operating state in which the electric motor is fed a battery string voltage which is reduced by a voltage value of a battery module voltage corresponding to a voltage value of the detected battery module.

5. The method according to claim 4, wherein:
the method is repeated correspondingly in response to detecting a further technical fault of a further detected battery module, and
the battery diagnosis routine is implemented while the traction drive system is operated in the transition state to determine if the electric traction drive system can continue to be operated by the battery with the further detected battery module being bridged and/or whether safety-relevant measures are introduced.

6. The method according to claim 3, wherein:
the detected battery module is included in a detected battery string, and
when the battery diagnosis routine determines that the electric traction drive system can continue to be operated by the battery with the detected battery module being bridged, a sufficiently large number of further battery modules of the detected battery string are connected to configure detected battery string as a replacement for the detected battery module in the detected battery string, such that the electric motor continues to be supplied with a battery string voltage which is correspondingly less reduced or maintained unchanged.

7. An apparatus for controlling an electric traction drive system including an electric motor and a battery, the battery including a plurality of battery strings, each battery string of the plurality of battery strings including a plurality of battery modules, the battery modules of the plurality of battery modules being connected selectively with positive polarization or negative polarization with respect to output terminals of a respective battery string or being bridged in the respective battery string, with the result that each battery string of the plurality of battery strings produces an adjustable output voltage, the apparatus comprising:
a monitoring device configured to monitor the plurality of battery modules during operation of the electric traction device for proper functioning,
wherein when a technical fault in at least one detected battery module is detected during the monitoring, the traction drive system is actuated in such a way that the at least one detected battery module is bridged and the traction drive system is transferred to a transition state in which the electric motor continues to be supplied and is actuated by remaining connected battery modules of the plurality of battery modules in such a way that a presently generated torque of the electric motor remains unchanged.

8. The apparatus for controlling an electric traction drive system according to claim 7, further comprising:
a battery diagnosis unit configured to implement a battery diagnosis routine while the electric traction drive system is operated in the transition state,
wherein the battery diagnostic routine is implemented in parallel with the transition state in order to decide whether the electric traction drive system can continue to be operated with the at least one detected battery module and/or whether safety-relevant measures are introduced, and
wherein the apparatus is further configured to operate the electric motor in accordance with field-oriented control.

9. A battery system comprising:
a battery including a plurality of battery strings, each battery string of the plurality of battery string including a plurality of battery modules, each battery module of the plurality of battery modules being configured to be connected selectively with positive polarization or negative polarization with respect to output terminals of a respective battery string or can be bridged in the respective battery string; and
an apparatus configured to control an electric traction drive system including a monitoring device configured to monitor the plurality of battery modules during operation of the electric traction device for proper functioning,
wherein when a technical fault in at least one detected battery module is detected during the monitoring, the traction drive system is actuated in such a way that the at least one detected battery module is bridged and the traction drive system is transferred to a transition state in which the electric motor continues to be supplied and is actuated by remaining connected battery modules of the plurality of battery modules in such a way that a presently generated torque of the electric motor remains unchanged.

10. The battery system according to claim 9, wherein:
the battery system is included in a vehicle which includes the electric motor, and
at least one of the battery system and the apparatus is arranged in a drive train of the vehicle.

* * * * *